(12) United States Patent
Lee et al.

(10) Patent No.: US 11,462,782 B2
(45) Date of Patent: Oct. 4, 2022

(54) BATTERY PACK AND VEHICLE INCLUDING BATTERY PACK

(71) Applicant: LG Chem, Ltd., Seoul (KR)

(72) Inventors: Su-Hang Lee, Daejeon (KR); Kyu Hyun Choi, Daejeon (KR); Ho-June Chi, Daejeon (KR); Jee-Soon Choi, Daejeon (KR)

(73) Assignee: LG Energy Solution, Ltd.

( * ) Notice: Subject to any disclaimer, the term of this patent is extended or adjusted under 35 U.S.C. 154(b) by 19 days.

(21) Appl. No.: 17/052,369

(22) PCT Filed: Aug. 26, 2019

(86) PCT No.: PCT/KR2019/010870
§ 371 (c)(1),
(2) Date: Nov. 2, 2020

(87) PCT Pub. No.: WO2020/060054
PCT Pub. Date: Mar. 26, 2020

(65) Prior Publication Data
US 2021/0242515 A1    Aug. 5, 2021

(30) Foreign Application Priority Data

Sep. 19, 2018 (KR) .................. 10-2018-0112332

(51) Int. Cl.
*H01M 10/6554* (2014.01)
*H01M 50/249* (2021.01)
(Continued)

(52) U.S. Cl.
CPC ..... *H01M 10/6554* (2015.04); *H01M 10/613* (2015.04); *H01M 10/625* (2015.04);
(Continued)

(58) Field of Classification Search
CPC ............ H01M 10/613; H01M 10/625; H01M 10/647; H01M 10/6554; H01M 10/6556;
(Continued)

(56) References Cited

U.S. PATENT DOCUMENTS

| | | |
|---|---|---|
| 2012/0100399 A1 | 4/2012 | Adachi et al. |
| 2013/0017422 A1 | 1/2013 | Bae et al. |

(Continued)

FOREIGN PATENT DOCUMENTS

| | | |
|---|---|---|
| CN | 107302069 A | 10/2017 |
| CN | 206834294 U | 1/2018 |

(Continued)

OTHER PUBLICATIONS

International Search Report for Application No. PCT/KR2019/010870 dated Dec. 27, 2019, 2 pages.

(Continued)

*Primary Examiner* — Lingwen R Zeng
(74) *Attorney, Agent, or Firm* — Lerner, David, Littenberg, Krumholz & Mentlik, LLP

(57) ABSTRACT

A battery pack includes a plurality of battery cells, a pack case partitioning an interior volume into a plurality of accommodation spaces capable of accommodating at least portions of the plurality of battery cells, a cooling mat disposed to contact upper surfaces of the plurality of battery cells inside the pack case, and an air cushion disposed perpendicular to the cooling mat and mounted to inner walls of the pack case along a front and rear direction.

9 Claims, 7 Drawing Sheets

(51) Int. Cl.
  *H01M 50/209* (2021.01)
  *H01M 10/613* (2014.01)
  *H01M 10/6556* (2014.01)
  *H01M 10/625* (2014.01)
  *H01M 10/647* (2014.01)
  *H01M 10/6568* (2014.01)
  *H01M 50/35* (2021.01)
  *H01M 50/227* (2021.01)

(52) U.S. Cl.
  CPC ..... *H01M 10/647* (2015.04); *H01M 10/6556* (2015.04); *H01M 10/6568* (2015.04); *H01M 50/209* (2021.01); *H01M 50/249* (2021.01); *H01M 50/35* (2021.01); *H01M 50/227* (2021.01); *H01M 2220/20* (2013.01); *Y02E 60/10* (2013.01)

(58) Field of Classification Search
  CPC ......... H01M 10/6568; H01M 2220/20; H01M 50/209; H01M 50/227; H01M 50/242; H01M 50/249; H01M 50/35; Y02E 60/10
  See application file for complete search history.

(56) References Cited

U.S. PATENT DOCUMENTS

| | | |
|---|---|---|
| 2014/0087231 A1 | 3/2014 | Schaefer et al. |
| 2015/0064541 A1 | 3/2015 | Noh et al. |
| 2015/0303420 A1 | 10/2015 | Watanabe et al. |
| 2016/0221443 A1* | 8/2016 | Yao ....................... H01M 50/24 |
| 2018/0062127 A1* | 3/2018 | Lee ................... H01M 10/0431 |
| 2018/0170206 A1 | 6/2018 | Kim et al. |
| 2018/0287116 A1 | 10/2018 | Seo et al. |
| 2020/0381694 A1* | 12/2020 | Rath .................... H01M 50/529 |

FOREIGN PATENT DOCUMENTS

| | | |
|---|---|---|
| CN | 207116551 U | 3/2018 |
| CN | 108493366 A | 9/2018 |
| EP | 3059782 A1 | 8/2016 |
| JP | 2009301877 A | 12/2009 |
| JP | 2012094330 A | 5/2012 |
| JP | 2014513380 A | 5/2014 |
| KR | 20130008298 A | 1/2013 |
| KR | 101347985 B1 | 1/2014 |
| KR | 20150024724 A | 3/2015 |
| KR | 20160024187 A | 3/2016 |
| KR | 101676734 B1 | 11/2016 |
| KR | 20180017695 A | 2/2018 |
| KR | 20180025643 A | 3/2018 |
| KR | 20180068379 A | 6/2018 |
| KR | 20180070764 A | 6/2018 |
| WO | 2017099513 A1 | 6/2017 |

OTHER PUBLICATIONS

Extended European Search Report including Written Opinion for Application No. 19862028.8 dated Sep. 7, 2021, pp. 1-9.
Extended European Search Report for Application No. EP 19862028, dated Jun. 18, 2021, 10 pages.

* cited by examiner

BATTERY PACK AND VEHICLE INCLUDING BATTERY PACK

CROSS-REFERENCE TO RELATED APPLICATIONS

The present application is a national phase entry under 35 U.S.C. § 371 of International Application No. PCT/KR2019/010870 filed Aug. 26, 2019, which claims priority from Korean Patent Application No. 10-2018-0112332 filed on Sep. 19, 2018, the disclosures of which are incorporated herein by reference.

TECHNICAL FIELD

The present disclosure relates to a battery pack and a vehicle including the battery pack.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attention as a new energy source for enhancing energy efficiency and environmental friendliness in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

Regarding the conventional battery pack, recently, the demand of consumers for a battery pack having a high capacity and a high energy density along with a slimmer and more compact design is increasing. In order to manufacture a battery pack for realizing the high energy density, more battery cells are needed, which may make the assembling process complicated. Thus, it is also required to improve the process efficiency.

Therefore, there is a demand for providing a battery pack capable of increasing the efficiency of the assembling process while securing a high energy density, and a vehicle including the battery pack.

DISCLOSURE

Technical Problem

The present disclosure is directed to providing a battery pack, which may improve the efficiency of the assembling process and secure a high energy density, and a vehicle including the battery pack.

In addition, the present disclosure is also directed to providing a battery pack, which may improve the cooling efficiency, and a vehicle including the battery pack.

Moreover, the present disclosure is also directed to providing a battery pack, which may buffer an external impact or the like, and a vehicle including the battery pack.

Technical Solution

In one aspect of the present disclosure, there is provided a battery pack, comprising: a plurality of battery cells; a pack case configured to have accommodation spaces capable of partitioning and accommodating the plurality of battery cells at least partially; a cooling mat disposed to contact upper surfaces of the plurality of battery cells inside the pack case; and an air cushion disposed perpendicular to the cooling mat and mounted to inner walls of the pack case along a front and rear direction.

The pack case may include: a base plate; a front plate mounted to a front side of the base plate; a rear plate disposed opposite to the front plate and mounted to a rear side of the base plate; a pair of side plates mounted to the base plate to be provided between the rear plate and the front plate and disposed to be spaced apart from each other by a predetermined distance along a width direction of the base plate; and a partition plate configured to partition an area between the pair of side plates to form the accommodation spaces and provided between the front plate and the rear plate in a front and rear direction of the base plate.

The cooling mat may include: a mat body configured to contact the upper surfaces of the plurality of battery cells; and a cooling channel formed in the mat body so that a cooling water for cooling the plurality of battery cells flows therein.

The mat body may be made of a rubber material.

The mat body may be filled with an air to buffer an external impact.

The mat body may have an air injection hole formed therein to inject the air.

The mat body may have a venting hole unit for discharging the air at a predetermined pressure or above.

The air cushion may have an air injection hole for filling a predetermined amount of air therein.

The air cushion may have a venting hole unit for discharging the air at a predetermined pressure or above.

The air cushion may be made of a rubber material.

In addition, the present disclosure provides a vehicle comprising: at least one battery pack according to the above embodiments.

Advantageous Effects

According to various embodiments as above, it is possible to provide a battery pack, which may improve the efficiency of the assembling process and achieve a high energy density, and a vehicle including the battery pack.

In addition, according to various embodiments as above, it is possible to provide a battery pack, which may improve the cooling efficiency, and a vehicle including the battery pack.

Moreover, according to various embodiments as above, it is possible to provide a battery pack, which may buffer an external impact or the like, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to scale, but rather the dimensions of some components may be exaggerated.

Figure 1:
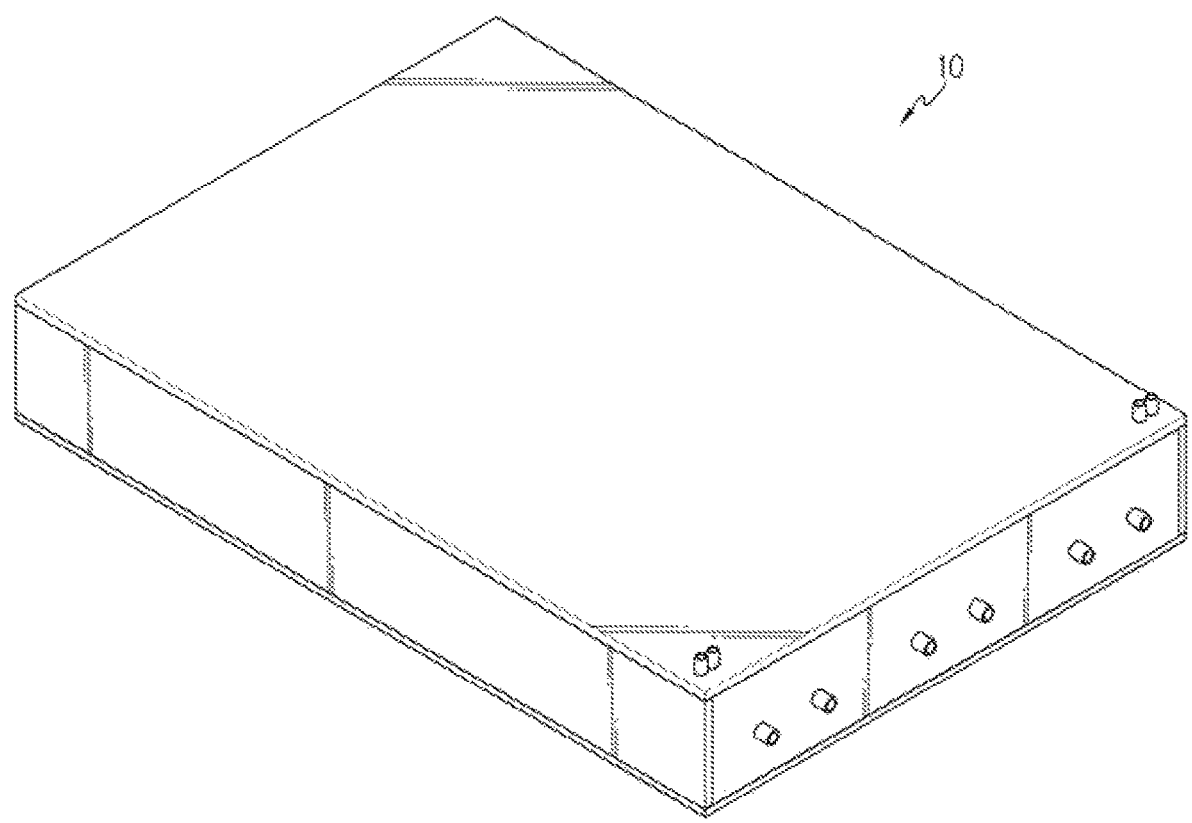
FIG. 1 is a perspective view illustrating a battery pack according to an embodiment of the present disclosure.
Figure 2:
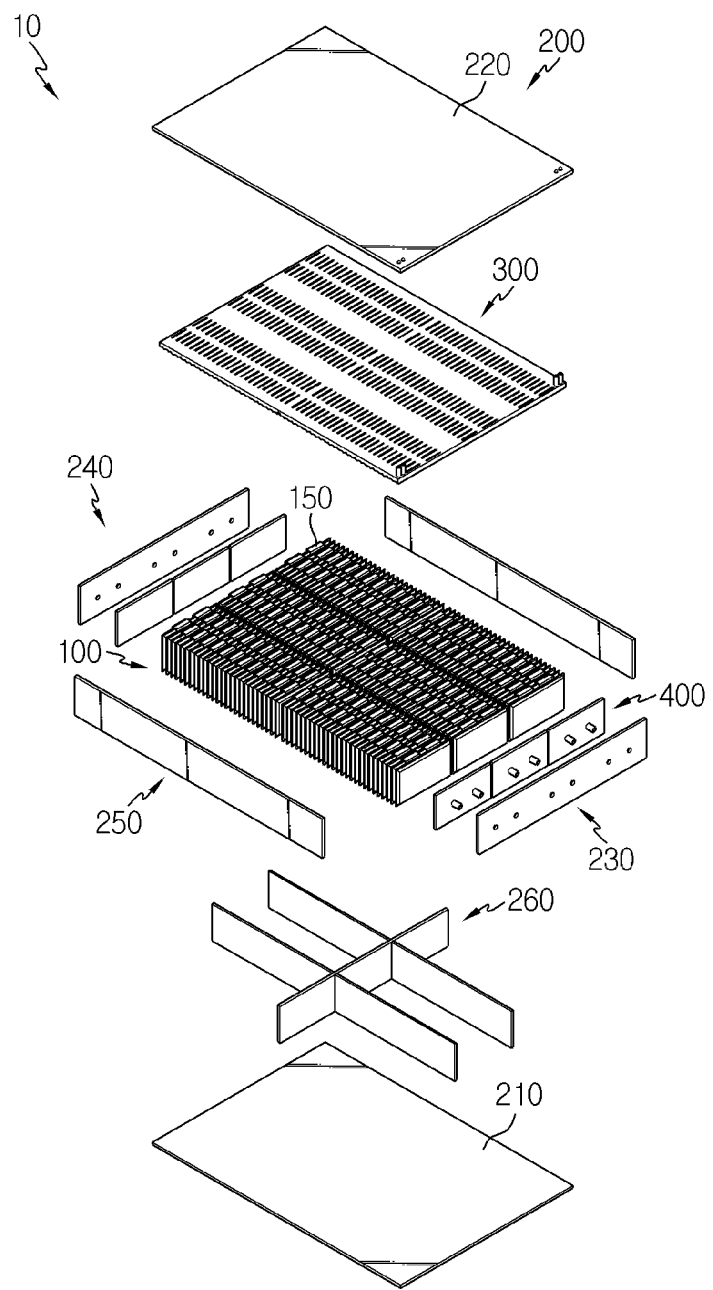
FIG. 2 is an exploded perspective view showing the battery pack of FIG. 1.
Figure 3:
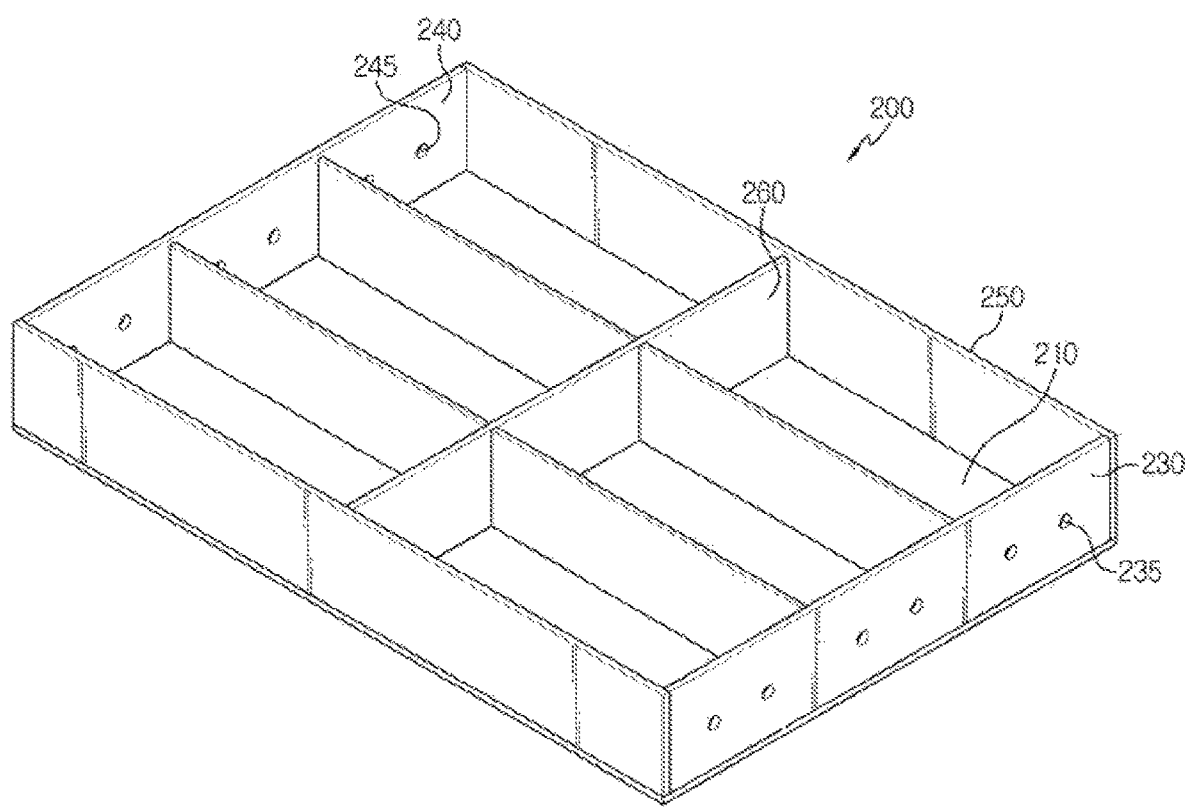
FIG. 3 is a perspective view illustrating a pack case of the battery pack of FIG. 2.
Figure 4:
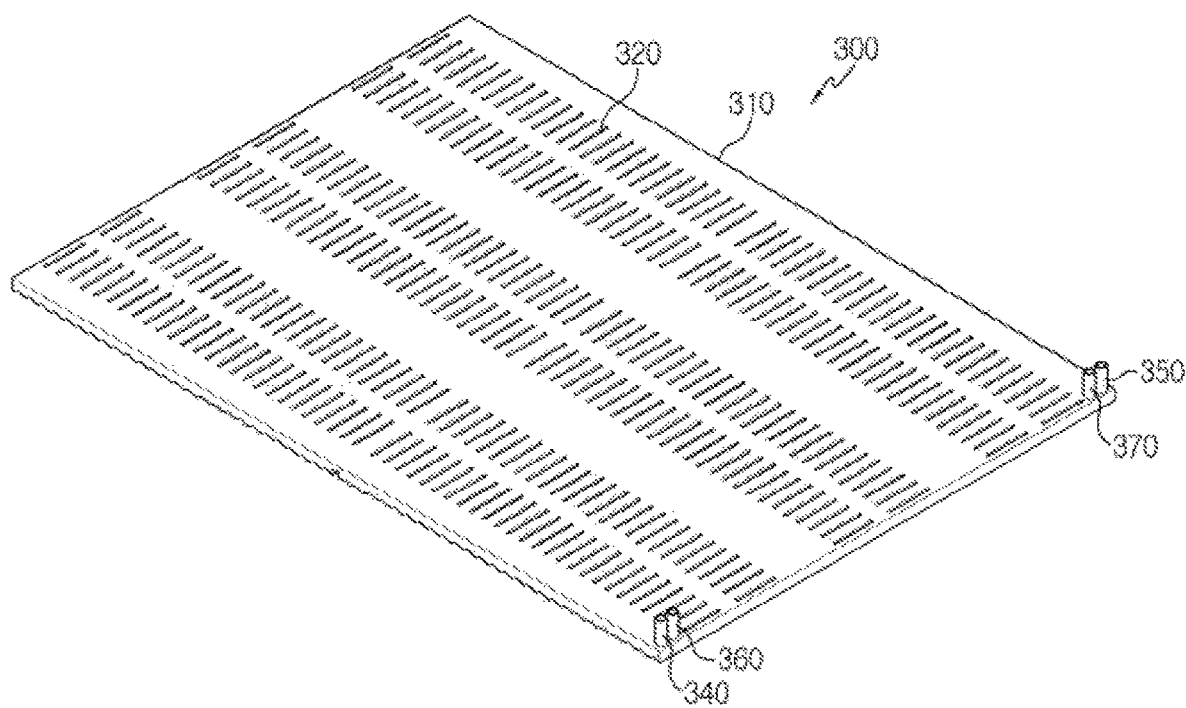
FIG. 4 is a perspective view illustrating a cooling mat of FIG. 2.
Figure 5:
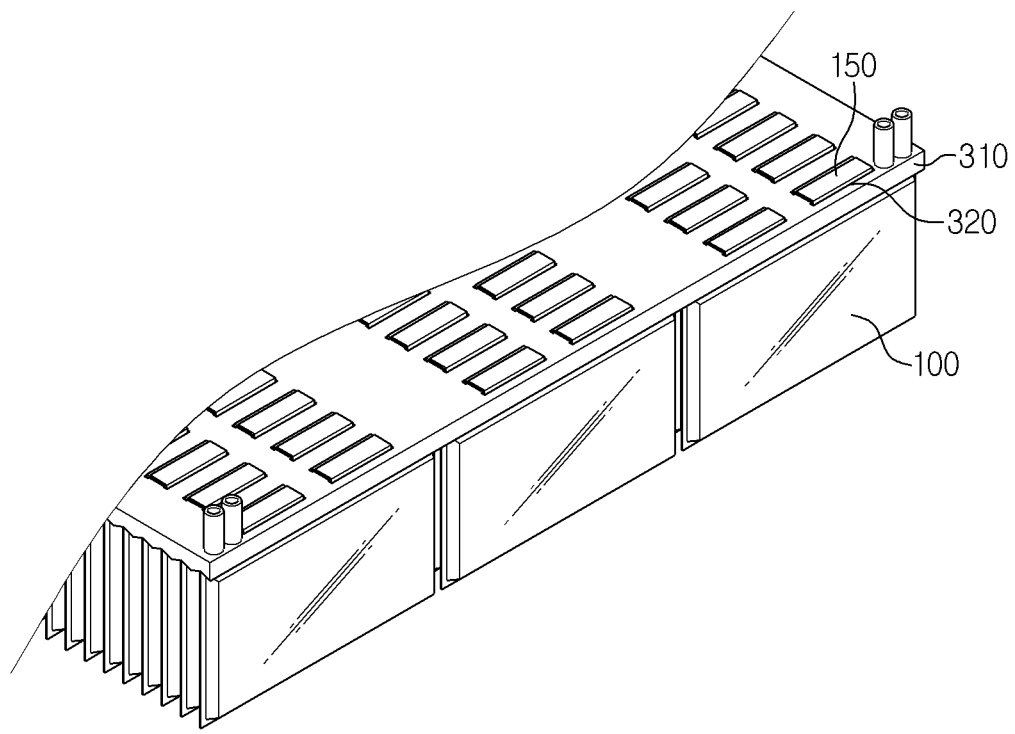
FIG. 5 is an enlarged perspective view illustrating main parts of the cooling mat of FIG. 4.
Figure 6:
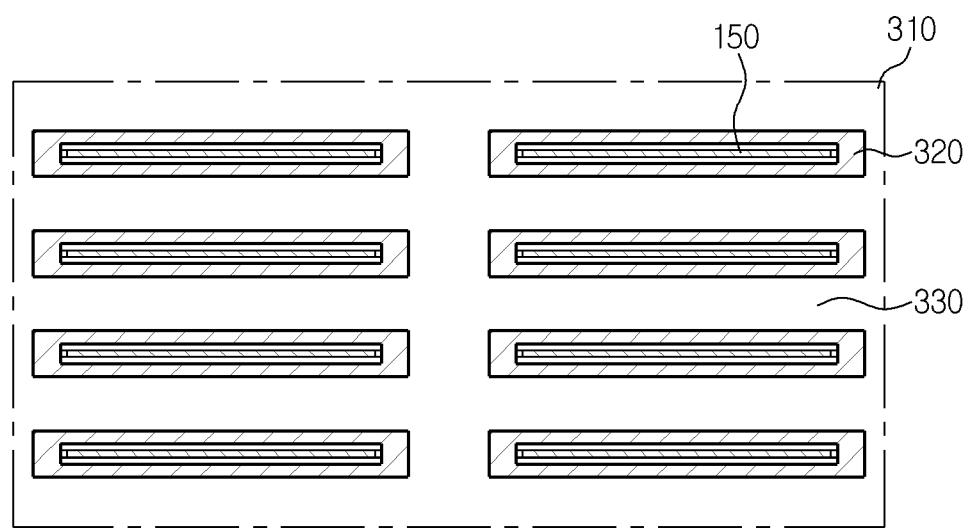
FIG. 6. is a cross-sectional plan view illustrating main parts of the cooling mat of FIG. 4.
Figure 7:
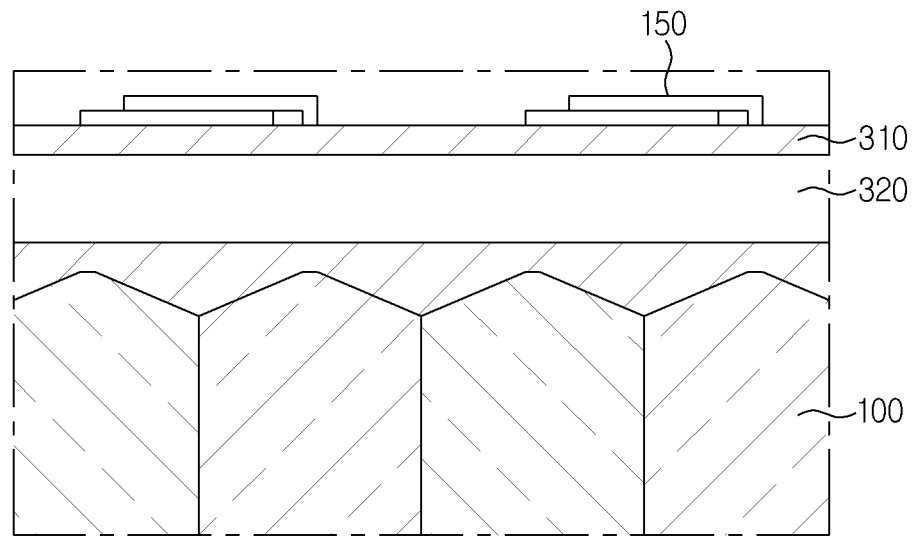
FIG. 7 is an enlarged cross-sectional elevation view illustrating main parts of the cooling mat of FIG. 4.
Figure 8:
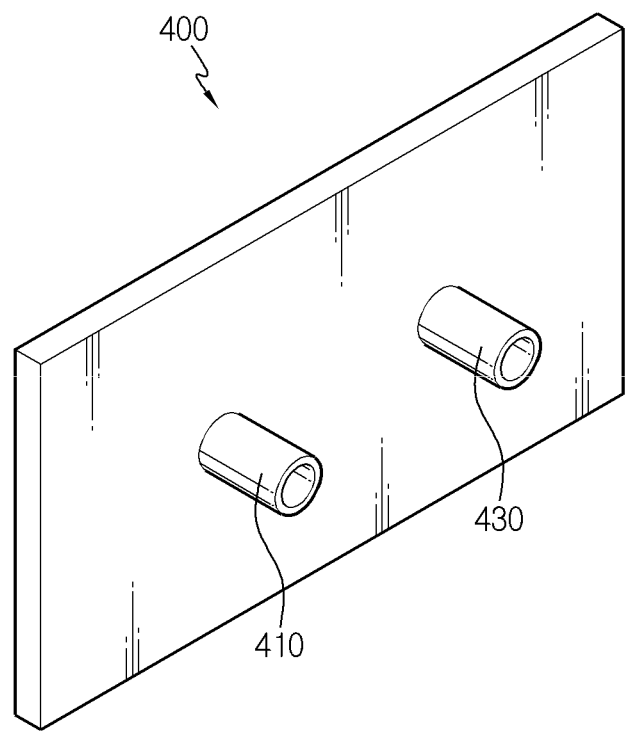
FIG. 8 is a perspective view illustrating an air cushion of FIG. 2.

FIG. 1 is a perspective view illustrating a battery pack according to an embodiment of the present disclosure, FIG. 2 is an exploded perspective view showing the battery pack of FIG. 1, FIG. 3 is a perspective view illustrating a pack case of the battery pack of FIG. 2, FIG. 4 is a perspective view illustrating a cooling mat of FIG. 2, FIGS. 5 to 7 are views illustrating main parts of the cooling mat of FIG. 4, and FIG. 8 is a perspective view illustrating an air cushion of FIG. 2.

Referring to FIGS. 1 to 8, the battery pack 10 may include a battery cell 100, a pack case 200 and a cooling mat 300.

The battery cell 100 may be provided as a secondary battery. The battery cell 100 may be provided as a pouch-type secondary battery, a rectangular secondary battery or a cylindrical secondary battery. Hereinafter, in this embodiment, the battery cell 100 will be described as a pouch-type secondary battery.

A plurality of the battery cells 100 may be provided. The plurality of battery cells 100 may be stacked so as to be electrically connected to each other. The electrical connection may be made through the connection of electrode leads 150 of the plurality of battery cells 100 and a bus bar.

The pack case 200 may accommodate the plurality of battery cells 100. The pack case 200 may have accommodation spaces that may partition and accommodate the plurality of battery cells 100 at least partially.

The pack case 200 may include a base plate 210, a cover plate 220, a front plate 230, a rear plate 240, a side plate 250 and a partition plate 260.

The base plate 210 supports the plurality of battery cells 100 and may have a plate shape of a predetermined size. The base plate 210 may be fixedly mounted to a vehicle V (see FIG. 9), explained later.

The cover plate 220 may cover upper portions of the plurality of battery cells 100. A cooling water supply tube 340, a cooling water discharge tube 350, an air injection hole 360 and a venting hole unit 370 of the cooling mat 300, explained later, may be provided through the cover plate 220.

The front plate 230 is mounted to a front side of the base plate 210 and may form the front of the pack case 200. The front plate 230 may have a plurality of perforation holes 235 through which an air injection hole 410 and a venting hole unit 430 of an air cushion 400, explained later, may be provided.

The rear plate 240 is disposed opposite the front plate 230 and may be mounted to a rear side of the base plate 210 to form the rear of the pack case 200.

The rear plate 240 may have a plurality of perforation holes 245 through which the air injection hole 410 and the venting hole unit 430 of the air cushion 400, explained later, may be provided.

The side plate 250 may be provided in a pair. The pair of side plates 250 are mounted to the base plate 210 to be provided between the rear plate 240 and the front plate 230 and may be disposed to be spaced apart from each other along a width direction of the base plate 210.

The partition plate 260 partitions an area between the pair of side plates 250 to form the accommodation spaces and may be provided between the front plate 230 and the rear plate 240 in a front and rear direction of the base plate 210.

By means of the partition plate 260, the plurality of battery cells 100 may be partitioned and accommodated in a predetermined number. In this embodiment, since the pack case 200 includes the partition plate 260, the plurality of battery cells 100 may be partitioned into a predetermined number and mounted to be directly accommodated in the pack case 200.

Accordingly, in this embodiment, since a structure such as a module case for separately packaging the predetermined number of battery cells 100 is not required, the battery pack 10 may have a slimmer and more compact design and secure a high energy density to give a high capacity.

Moreover, in this embodiment, since a structure such as a separate module case is eliminated, the assembling process may be simplified, thereby improving the process efficiency and lowering the manufacturing cost.

The cooling mat 300 may be disposed in contact with upper surfaces of the plurality of battery cells 100 inside the pack case 200. To this end, the cooling mat 300 may be sized to entirely cover the upper surfaces of the plurality of battery cells 100.

The cooling mat 300 may include a mat body 310, a lead passing hole 320, a cooling channel 330, a cooling water supply tube 340, a cooling water discharge tube 350, an air injection hole 360, and a venting hole unit 370.

The mat body 310 may be made of a rubber material with a predetermined volume. The mat body 310 may be in direct contact with the upper surfaces of the plurality of battery cells 100 and may be filled with a predetermined amount of air therein to buffer an external impact or the like.

The lead passing hole 320 is formed in the mat body 310 and may allow the electrode leads 150 of the plurality of battery cells 100 to pass therethrough. To this end, a plurality of the lead passing holes 320 may be provided.

The cooling channel 330 may be formed in the mat body 310. A cooling water for cooling the plurality of battery cells 100 may flow in the cooling channel 330.

The cooling channel 330 may be formed in a space between the electrode leads 150 of the plurality of battery cells 100 to avoid interference with the electrode leads 150 of the plurality of battery cells 100.

In this embodiment, the cooling channel 330 is provided, and it is possible to significantly improve the cooling performance of the plurality of battery cells 100 by means of the cooling mat 300 in direct contact with the plurality of battery cells 100.

The cooling water supply tube 340 may be provided in the mat body 310 to communicate with the cooling channel 330. The cooling water supply tube 340 may protrude out of the cover plate 220 of the pack case 200 to receive the cooling water from the outside.

The cooling water discharge tube 350 may be provided to the mat body 310 to communicate with the cooling channel 330. The cooling water discharge tube 350 may protrude out of the cover plate 220 of the pack case 200 to discharge the cooling water to the outside.

The air injection hole 360 is for injecting an air into the mat body 310 and may be provided in the mat body 310. The air injection hole 360 may protrude out of the cover plate 220 of the pack case 200 to easily inject the air from the outside.

Through the air injection hole 360, a manufacturer or user of the battery pack 10 may periodically inject an air into the mat body 310 to maintain the inside of the battery pack 10 at a constant pressure.

The venting hole unit 370 may discharge the air inside the mat body 310 to the outside at a predetermined pressure or above. To this end, the venting hole unit 370 may protrude out of the cover plate 220 of the pack case 200.

Since the battery pack 10 discharges the air inside the mat body 310 to the outside through the venting hole unit 370 when the internal pressure increases due to the inflation of the plurality of battery cells 100, it is possible to minimize a rapid increase of the internal pressure of the battery pack 10.

Meanwhile, the battery pack 10 may include an air cushion 400.

The air cushion 400 is disposed perpendicular to the cooling mat 300 and may be mounted to inner walls of the pack case 200 along a front and rear direction. In detail, the air cushion 400 may be mounted to an inner wall of the front plate 230 and an inner wall of the rear plate 240.

A plurality of the air cushions 400 may be provided, and the plurality of air cushions 400 may be made of a rubber material, similar to the cooling mat 300, and be filled with a predetermined amount of air therein to buffer an external impact or the like.

The air cushion 400 may include an air injection hole 410 and a venting hole unit 430.

The air injection hole 410 is for injecting an air into the air cushion 400 and may protrude out of the front plate 230 and the rear plate 240 of the pack case 200 to easily inject the air from the outside.

Through the air injection hole 410, the manufacturer or user of the battery pack 10 may periodically inject an air into the air cushion 400 to maintain the inside of the battery pack 10 at a predetermined pressure. That is, the manufacturer or the user may maintain the internal pressure of the battery pack 10 at a predetermined desired pressure by means of the air cushion 400 as well as the cooling mat 300.

The venting hole unit 430 may discharge the air inside the air cushion 400 to the outside at a predetermined pressure or above. To this end, the venting hole unit 430 may protrude out of the front plate 230 and the rear plate 240 of the pack case 200.

Through the venting hole unit 430, the battery pack 10 discharges the air inside the air cushion 400 as well as the cooling mat 300 when the internal pressure increases due to the inflation of the plurality of battery cells 100, thereby minimizing a rapid increase of the internal pressure of the battery pack 10.

Figure 9:
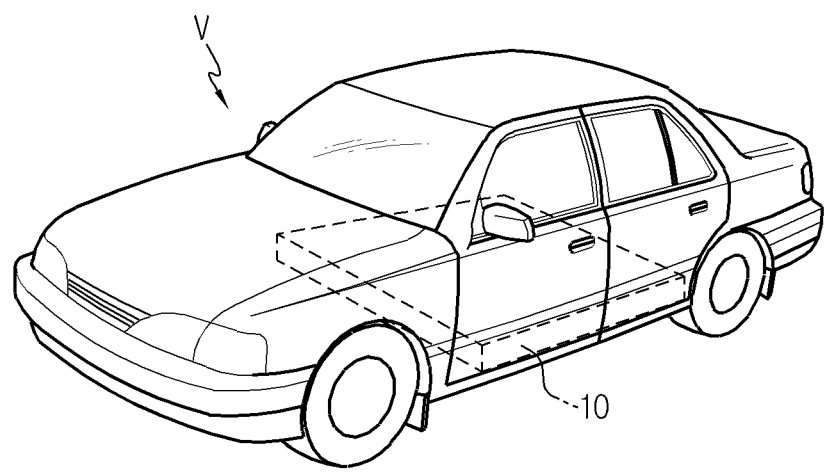
FIG. 9 is a perspective diagram illustrating a vehicle according to an embodiment of the present disclosure.

FIG. 9 is a perspective diagram illustrating a vehicle according to an embodiment of the present disclosure.

Referring to FIG. 9, a vehicle V may include at least one battery pack 10 according to the former embodiment. The vehicle V may be an electric vehicle, a hybrid vehicle, and various other-type vehicles capable of using the battery pack 10 as a fuel source.

In addition, the battery pack 10 may be provided in other devices, instruments or facilities such as an energy storage system using a secondary battery, in addition to the vehicle V.

As described above, the vehicle V of this embodiment and devices, instruments or facilities, such as the vehicle V, which have the battery pack 10, include the battery pack 10 as described above, and thus it is possible to implement devices, instruments, facilities or the like, such as a vehicle V, which have all the advantages of the battery pack 10 described above.

According to various embodiments as above, it is possible to provide the battery pack 10, which may improve the efficiency of the assembling process and achieve a high energy density, and the vehicle V including the battery pack 10.

In addition, according to various embodiments as above, it is possible to provide the battery pack 10, which may improve the cooling efficiency, and the vehicle V including the battery pack 10.

Moreover, according to various embodiments as above, it is possible to provide the battery pack 10, which may buffer an external impact or the like, and the vehicle V including the battery pack 10.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:
1. A battery pack, comprising:
  a plurality of battery cells arranged in a stack and electrically connected to each other through electrode leads of the plurality of battery cells and a bus bar;
  a pack case defining an interior volume and partitioning the interior volume into a plurality of accommodation spaces, each accommodation space capable of accommodating at least a portion of a respective one of the plurality of battery cells;
  a cooling mat disposed to contact upper surfaces of the plurality of battery cells positioned inside the pack case; and
  an air cushion oriented perpendicularly to the cooling mat and positioned along inner walls of the pack case in a front and rear direction, wherein the cooling mat includes a mat body extending in first and second perpendicular directions and contacting the upper surfaces of the plurality of battery cells, and a cooling channel formed in the mat body and configured to receive a flow of a cooling liquid therein, the mat body including a gas therein configured to buffer an external impact, and wherein the electrode leads of the plurality of battery cells extend through the cooling mat in a third direction perpendicular to the first direction and the second direction.

2. The battery pack according to claim 1,
wherein the pack case includes:
a base plate;
a front plate connected to a front side of the base plate;
a rear plate disposed opposite to the front plate and connected to a rear side of the base plate;
a pair of side plates connected to the base plate between the rear plate and the front plate, the pair of side plates being spaced apart from each other by a predetermined distance along a width direction, the width direction being orthogonal to the front and rear direction; and
a partition plate configured to partition the volume defined between the pair of side plates to define the accommodation spaces, the partition plate positioned between the front plate and the rear plate in the front and rear direction.

3. The battery pack according to claim 1,
wherein the mat body is made of rubber material.

4. The battery pack according to claim 1,
wherein the mat body has a gas injection hole defined therein to inject the gas into the mat body.

5. The battery pack according to claim 1,
wherein the mat body has a venting hole unit for discharging the gas from the mat body when the gas is at a predetermined pressure or above.

6. The battery pack according to claim 1,
wherein the air cushion has a gas injection hole for injecting a predetermined amount of gas into the air cushion.

7. The battery pack according to claim 1,
wherein the air cushion has a venting hole unit for discharging the gas from the air cushion when the gas is at a predetermined pressure or above.

8. The battery pack according to claim 1,
wherein the air cushion is made of a rubber material.

9. A vehicle, comprising at least one battery pack according to claim 1.

* * * * *